(12) United States Patent
Bickford et al.

(10) Patent No.: US 8,423,945 B2
(45) Date of Patent: Apr. 16, 2013

(54) METHODS AND SYSTEMS TO MEET TECHNOLOGY PATTERN DENSITY REQUIREMENTS OF SEMICONDUCTOR FABRICATION PROCESSES

(75) Inventors: Jeanne P. Bickford, Essex Junction, VT (US); Allan O. Cruz, Colchester, VT (US); Michelle Gill, Grand Isle, VT (US); Howard S. Landis, Underhill, VT (US); David V. MacDonnell, II, Huntington, VT (US); Donald J. Samuels, Silverthorne, CO (US); Roger J. Yerdon, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 12/782,337

(22) Filed: May 18, 2010

(65) Prior Publication Data
US 2011/0289470 A1    Nov. 24, 2011

(51) Int. Cl.
*G06F 17/50*    (2006.01)
*G06F 9/455*    (2006.01)

(52) U.S. Cl.
USPC .......................................... 716/132; 716/122

(58) Field of Classification Search .................. 716/132, 716/122
See application file for complete search history.

(56) References Cited

U.S. PATENT DOCUMENTS

| | | | |
|---|---|---|---|
| 5,597,668 A | | 1/1997 | Nowak et al. |
| 5,885,856 A | * | 3/1999 | Gilbert et al. ................. 438/129 |
| 6,335,560 B1 | * | 1/2002 | Takeuchi ....................... 257/620 |
| 6,495,855 B1 | * | 12/2002 | Sawamura ...................... 257/48 |
| 7,279,259 B2 | | 10/2007 | Ito et al. |
| 7,328,419 B2 | | 2/2008 | Vuong et al. |
| 7,687,914 B2 | * | 3/2010 | Kuroda et al. ................ 257/758 |
| 2006/0081896 A1 | | 4/2006 | Maeda |
| 2008/0148212 A1 | | 6/2008 | Vuong et al. |
| 2008/0179754 A1 | * | 7/2008 | Hirabayashi .................. 257/773 |
| 2008/0315365 A1 | * | 12/2008 | Takada .......................... 257/618 |
| 2009/0044164 A1 | * | 2/2009 | Lee ..................................... 716/9 |
| 2009/0055792 A1 | * | 2/2009 | Itagaki ............................. 716/13 |
| 2009/0125870 A1 | * | 5/2009 | Aton et al. ....................... 716/21 |
| 2009/0228854 A1 | * | 9/2009 | Sakamoto ........................ 716/10 |
| 2009/0276745 A1 | * | 11/2009 | Nitta .................................. 716/6 |
| 2009/0321891 A1 | * | 12/2009 | Suzuki et al. ................ 257/620 |
| 2010/0293515 A1 | * | 11/2010 | Inoue et al. ..................... 716/14 |

FOREIGN PATENT DOCUMENTS

| | | |
|---|---|---|
| JP | 2003-077798 | 3/2003 |
| JP | 2006-121074 | 5/2006 |
| JP | 2006-184702 | 7/2006 |

* cited by examiner

*Primary Examiner* — Vuthe Siek
*Assistant Examiner* — Magid Dimyan
(74) *Attorney, Agent, or Firm* — Richard Kotulak; Roberts Mlotkowski Safran & Cole, P.C.

(57) ABSTRACT

Techniques, systems, and methods are provided for optimizing pattern density fill patterns for integrated circuits. The method includes adjusting an area of a scribe line and a density of dummy fill shapes in the adjusted scribe line, while maintaining an area of the die, to achieve a pattern density associated with technology ground rules for a particular design of the die.

9 Claims, 6 Drawing Sheets

METHODS AND SYSTEMS TO MEET TECHNOLOGY PATTERN DENSITY REQUIREMENTS OF SEMICONDUCTOR FABRICATION PROCESSES

FIELD OF THE INVENTION

The invention relates to the design and manufacture of integrated circuits, and more particularly, to techniques, systems, and methods for optimizing pattern density fill patterns for integrated circuits.

BACKGROUND

Pattern Density control is important to yield of integrated circuits. For example, pattern density is required to meet certain ground rules in the manufacture of the integrated circuit. More specifically, the pattern density of the integrated circuit must meet certain density requirements in order to ensure device reliability.

With conventional design tools, pattern density can be adjusted by the use of dummy patterns within the die area. These dummy patterns are generated for a region of an integrated circuit by obtaining a pattern density for the die and adjusting the density as a function of the design of the die. Current methods to add dummy fill shapes to achieve density objectives increase die area which leads to increased die and packaging costs. Also, as the technology advances and the pattern density ground rules are relaxed, to take advantage of the improved process window it is necessary to redesign the die, which is an expensive and time consuming process. Conventional design tools and methods also do not know or take into account the total density of the shapes within the die and the scribe line.

Accordingly, there exists a need in the art to overcome the deficiencies and limitations described hereinabove.

SUMMARY

In a first aspect of the invention, a method comprises adjusting dummy fill shapes within a scribe line to achieve a pattern density associated with technology ground rules for a particular design of an integrated circuit at a particular level of manufacture.

In another aspect of the invention, a method of adjusting a pattern density of a die comprises adjusting an area of a scribe line and dummy fill shapes in the adjusted scribe line, while maintaining an area of the die, to achieve a pattern density associated with technology ground rules for a particular design of the die.

In yet another aspect of the invention, an optimizer is implemented in hardware. The optimizer is operable to calculate scribe line area needed to adjust a density of the dummy fill shapes, at each level of processing, to meet ground rules of a particular design.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of the wafer with dummy fill shapes which comprises the structures of the present invention. In still further embodiments, a method in a computer-aided design system is provided for generating a functional design model of the structure of the present invention. The method comprises generating a functional representation of the structural elements thereof.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
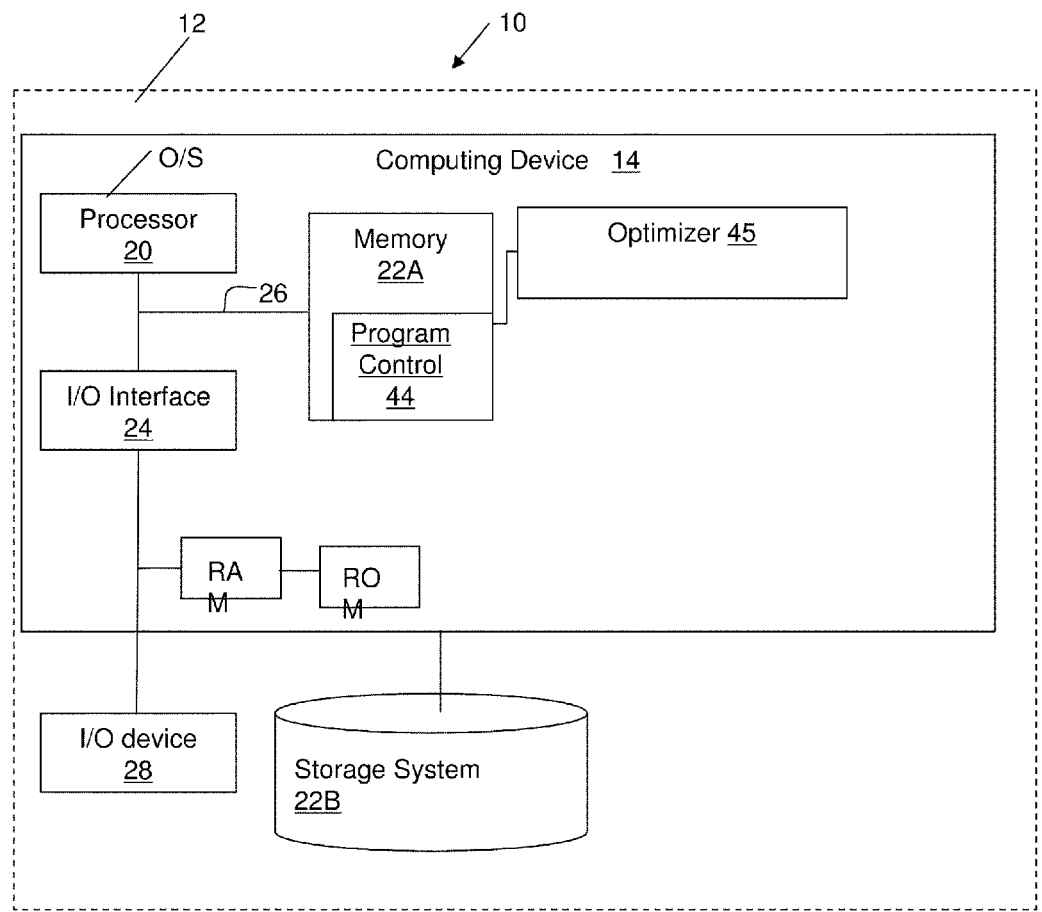
FIG. 1 shows an illustrative environment for implementing the steps in accordance with aspects of the invention.

The invention relates to the design and manufacture of integrated circuits, and more particularly, to techniques, systems, and methods for optimizing pattern density fill patterns for integrated circuits. In embodiments, the systems and methods of the present invention improve yields of the integrated circuits by adjusting a density of dummy fill shapes within a die to die area (e.g., scribe line or kerf) on the wafer, compared to growing the die area itself. This can be performed by, for example, adjusting the density (e.g., adding or deleting) of dummy fill shapes within the scribe line, as well as increasing the area of the scribe line to make further pattern density adjustments (e.g., increase or decrease density of dummy fill shapes, as needed).

In a more specific embodiment, dummy fill shapes can be placed within the scribe line on the wafer to increase the pattern density of the integrated circuit, on any level. In additional or alternative embodiments, the systems and methods of the present invention adjust the area, e.g., increase or decrease, of the scribe lines on the wafer. By increasing the scribe line area, it is possible to add additional dummy fill shapes within the scribe line to improve yield of the integrated circuits. The present invention can also make other adjustments to the density of the dummy fill shapes and scribe line area, e.g., decrease the scribe line and density of the dummy fill shapes, due to adjustments made to the ground rules for certain designs.

Advantageously, the dummy fill shapes within the scribe line do not need to meet technology ground rules (i.e., can violate the ground rules); however, they can be used to improve long range pattern density of the integrated circuits to meet the required ground rules of the die. Also, advantageously, the methods and systems of the present invention allow the designer/fabricator to increase or decrease long range pattern density at each level of the manufacturing process, without impacting the design or area of the die, e.g., the die remains as small as possible. For example, the dummy fill shapes will not affect the overall design of the integrated circuit, as they will be removed during dicing operations. Moreover, as the fabrication processes of a particular technology node become more efficient, the dummy fill shapes can be reduced, eliminated or otherwise adjusted within the scribe line without affecting the need to redesign the integrated circuit (i.e., there is no need to remove dummy fill shapes within the die area). Also, eliminating the need to grow the die, in turn, significantly reduces expensive package costs associated with laminates needed for larger dies.

As such, by implementing the aspects of the present invention, it is now possible to minimize the cost of designing and fabricating integrated circuits, regardless of the ground rule requirements. For example, less die area can be used which translates into an increased chip to wafer ratio. Also, as the dummy fill shapes within the scribe line do not need to meet ground rules, it is now easier to make adjustments without affecting the overall die design. This translates into denser patterns, limited die size growth, and package costs being avoided due to a smaller die area, to name a few cost advantages.

FIG. 1 shows an illustrative environment for implementing the steps in accordance with aspects of the invention. More specifically, FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls an optimizer 45. The optimizer 45 is operable to adjust pattern densities within the scribe line, e.g., the processes described herein. More specifically, the optimizer 45 can make adjustments to the density of dummy fill shapes within the scribe line to meet ground rule objectives. The optimizer 45 can also make adjustments to the scribe line to increase (or decrease) the amount of dummy fill shapes within the scribe line to meet ground rule objectives. For example, as technology processes advance (become more efficient, for example), the optimizer 45 can decrease (i) the amount or density of dummy fill shapes within the scribe line area and/or (ii) the scribe line area and density of dummy fill shapes within the adjusted scribe line, without affecting the design within the die. In embodiments, the optimizer 45 will make such adjustments through calculations and/or flow processes, described below.

The optimizer 45 can be implemented as one or more program code in the program control 44 stored in memory 22A as separate or combined modules. Additionally, the optimizer 45 may be implemented as separate dedicated processors or a single or several processors to provide the functions of this tool. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet, or
- a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 2:
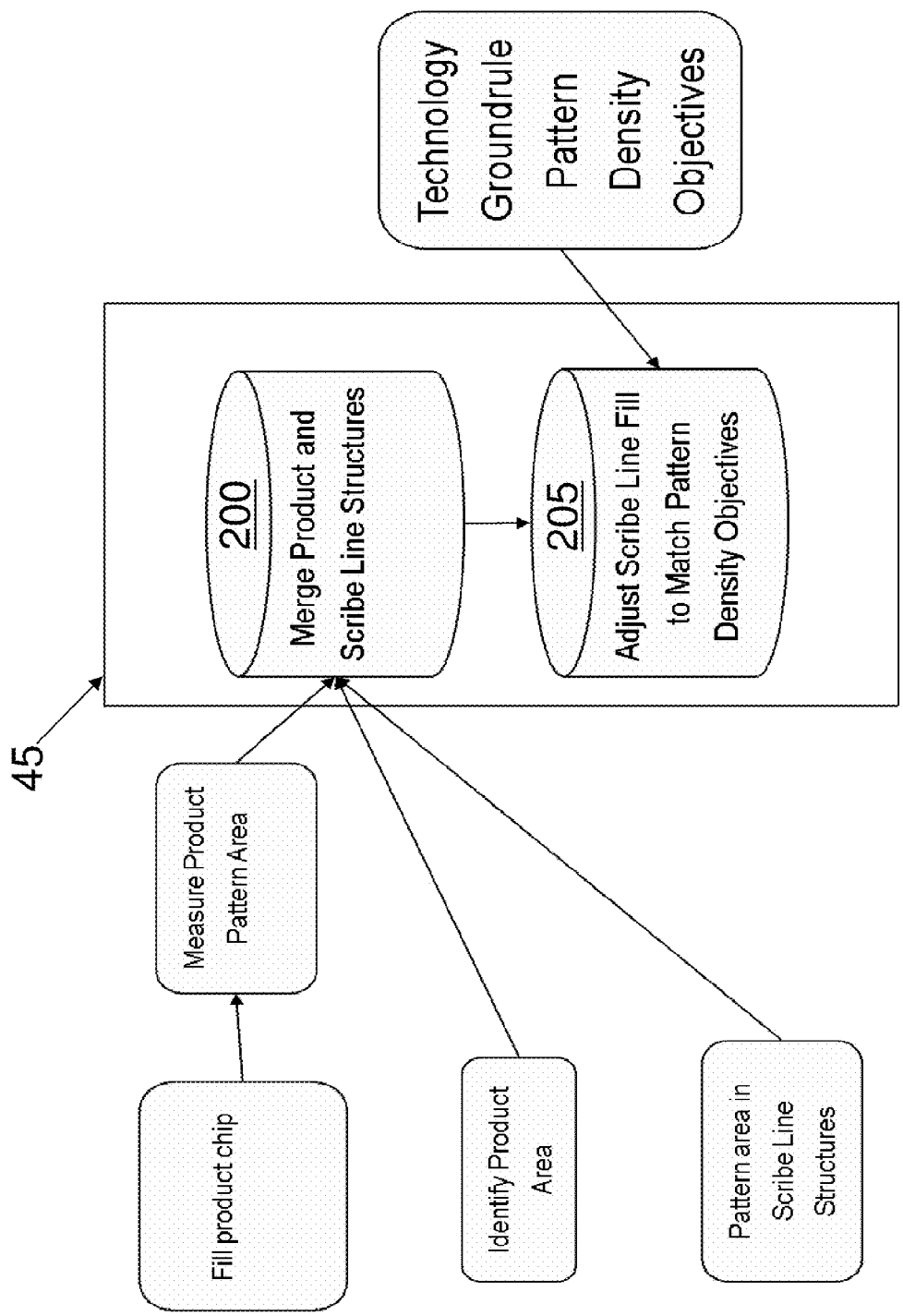
FIG. 2 shows a process flow and/or block diagram in accordance with aspects of the present invention.

FIG. 2 shows a process flow and/or block diagram in accordance with aspects of the present invention. The steps of FIG. 2 (and FIG. 4) may be implemented in the environment of FIG. 1, for example. The flow diagram may equally represent a high-level block diagram or a swim-lane diagram of the invention. The flowchart and/or block diagram illustrates the architecture, functionality, and operation of possible implementations of systems, methods and computer program products according to various embodiments of the present invention. In this regard, each block in any of the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figure. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any designer or fabricator of integrated circuits. In return, the service provider can receive payment from the customer(s) under a subscription and/or fee agreement.

In particular, FIG. 2 shows the data required for the optimizer 45 to determine a required pattern density of dummy fill shapes within a scribe line, and the processes therein. The data includes, for example, a pattern area for scribe line (e.g., also known as kerf or die to die area). The pattern area can include, for example, pattern densities of the structures already designed within the scribe line. These structures can be shapes that are needed to monitor aspects of the process such as, for example, at in-line test. Additional data may include, for example, product pattern area composed of shapes used in the product design and fill shapes added to the product to increase pattern density. Further data may include the pattern associated with fill shapes designed according to technology ground rules.

The data described herein may be provided by the designer, fabrication house, or other third party vendor. The data can also be obtained directly by the optimizer 45 by analyzing the design requirements for each chip. The data can be stored in the database 22B of FIG. 1.

In embodiments, at step 200, the optimizer 45 can merge the product and scribe line structures (e.g., design structures and dummy fill shapes) to obtain a total density on the wafer, at each level of processing. This can be performed by a simple additive process. At step 205, the optimizer adjusts the density of the dummy fill shapes within the scribe line to match the pattern density objectives for the particular design requirements at a particular design level. This step takes into account the merged total density of the wafer, for example. The pattern density objectives are provided to the optimizer 45 as additional data. Dummy fill shapes are added or subtracted to the scribe line area to meet the pattern density technology groundrule.

In embodiments, the steps described in FIG. 2, for example, can be described by the following equation:

Amount of Scribe Line Area fill=(Exposed Reticle Area)(Ground rule Density)−Chip pattern Area−Scribe Line Structure Area.

The chip pattern area is the area of the structures within the die. The scribe line structure area, on the other hand, is defined as the structures within the die to die area. The ground rule density is the required density for the pattern at a particular level, as required to fabricate the chip. For example, ground rule density can be defined as:

Target Density=Pattern Area/Exposed Reticle Area Imaged on Wafer.

The processes of FIG. 2 will also, for example, avoid overfill of the scribe line and, by making adjustments to the density of the dummy fill shapes when there is an overfill (e.g., density too high). The adjustment of the dummy fill shapes enables the fabricator to meet newly realized ground rule objectives, e.g., due to advances in the fabrication process, without affecting the die design. This is due to the fact that the dummy fill shapes within the scribe line do the affect the die area, and are removed during dicing processes.

Figure 3:
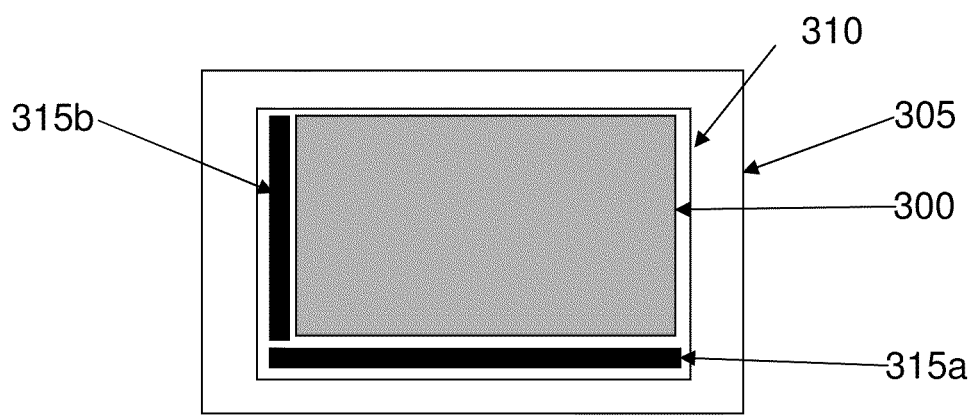
FIG. 3 shows a representative adjustment of pattern density within a die to die area (also known as a scribe line or kerf), in accordance with aspects of the invention.

FIG. 3 shows a representative adjustment of dummy fill shapes within a scribe line, in accordance with aspects of the invention. In this representative structure, the product chip (die) 300 is shown to be formed within a reticle space 305. It should be understood by those of skill in the art that the product chip 300 includes design features (design structures (active and passive devices) and dummy fill shapes). The outside perimeter of the product chip 300, as defined by an area between the perimeter of the exposed reticle area 310 and product chip 300. The exposed reticle area includes structures 315a which may be provided by the designer to monitor processes during in-line testing. Other structures 315b are added (or deleted) by the optimizer of the present invention to adjust the long range pattern density. The structures 315b, e.g., dummy fill shapes, may be within any area of the exposed recticle area 310. As described herein, the dummy fill shapes 315b do not have meet ground rules (i.e., can violate the ground rules) nor do they have to be reliable since they are removed during dicing and make no part of the final integrated circuit. As efficiencies of the fabrication processes advance, the dummy fill shapes 315b can be removed to adjust pattern densities, to meet ground rule requirements.

Figure 4:
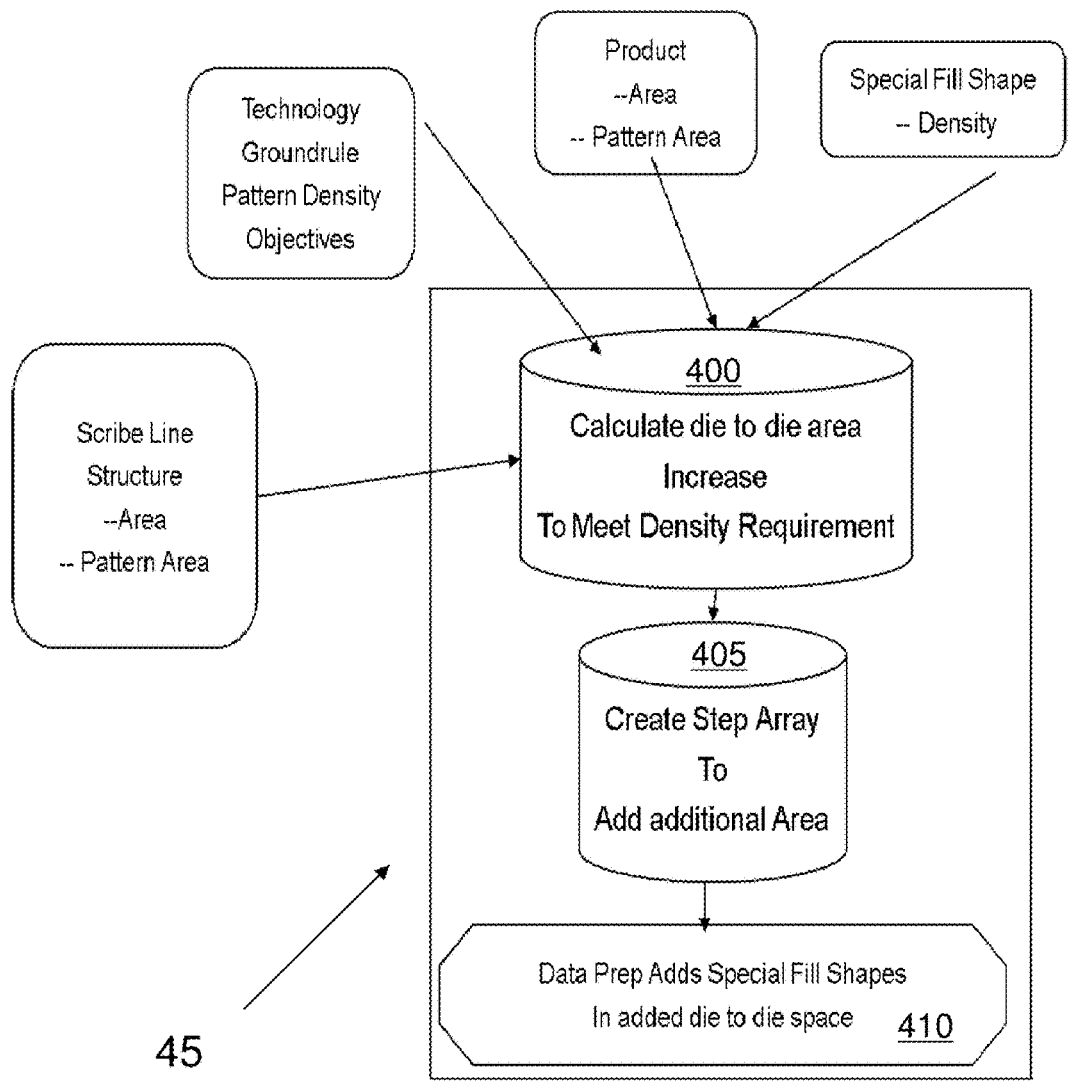
FIG. 4 shows a process flow and/or block diagram in accordance with aspects of the present invention.

FIG. 4 shows a process flow and/or block diagram in accordance with aspects of the present invention. In particular, FIG. 4 shows the data required for the optimizer 45 to determine an adjustment to scribe line and a required density within the adjusted scribe line to meet certain ground rules, and the processes therein. The data includes, for example, a scribe line structure area and pattern area for the scribe line area. The pattern area can include, for example, pattern densities of the structures already designed within the scribe line area, e.g., shapes that are needed to monitor aspects of the process such as, for example, at in-line test. Additional data may include, for example, the product area and pattern area (pattern density) for the product area. The product area may be, for example, the designed pattern density associated with the shapes used in the product design and fill shapes added in empty areas in the product to increase pattern density closer to the pattern density technology ground rule requirements for a particular chip design, at each level. Further data may include the pattern density technology ground rules and the density of special fill shapes (dummy fill shapes) outside of the die area.

The data described herein may be provided by the designer, fabrication house, or other third party vendor. The data can also be obtained directly by the optimizer 45 by analyzing the design requirements for each chip. The data can be stored in the database 22B of FIG. 1.

In embodiments, at step 400, the optimizer 45 calculates the scribe line area needed in order to adjust the density of the dummy fill shapes, at each level of processing. That is, the optimizer 45 can calculate how much space is required between dies and the required density of the dummy fill shapes in order meet a density requirement, e.g., ground rules. This can be calculated using the following equations, for example:

Total Scribe Line Area for special fill=[(Exposed Reticle Area)(Ground rule Density)−Chip pattern Area−Scribe Line Structure Area]/(density of dummy fill shapes in special fill region)

Added Scribe Line Area=Total Scribe Line Area for special fill−open scribe line area.

At step 405, the optimizer 45 creates a step array to add additional area to the scribe line, as needed. This may be performed by using the adjustments calculated at step 400. It should be understood, though, the step 405, if necessary, can create an array to decrease the area of the scribe line. At step 410, the optimizer 45 can adjust (e.g., add or delete) dummy fill shapes within the adjusted scribe line area to achieve a certain density. In this way, dummy fill shapes within the adjusted scribe line area can be used to match the pattern density objectives for the particular design at a particular design level. As described above, the processes herein will also, for example, avoid overfill of the scribe line.

Figure 5:
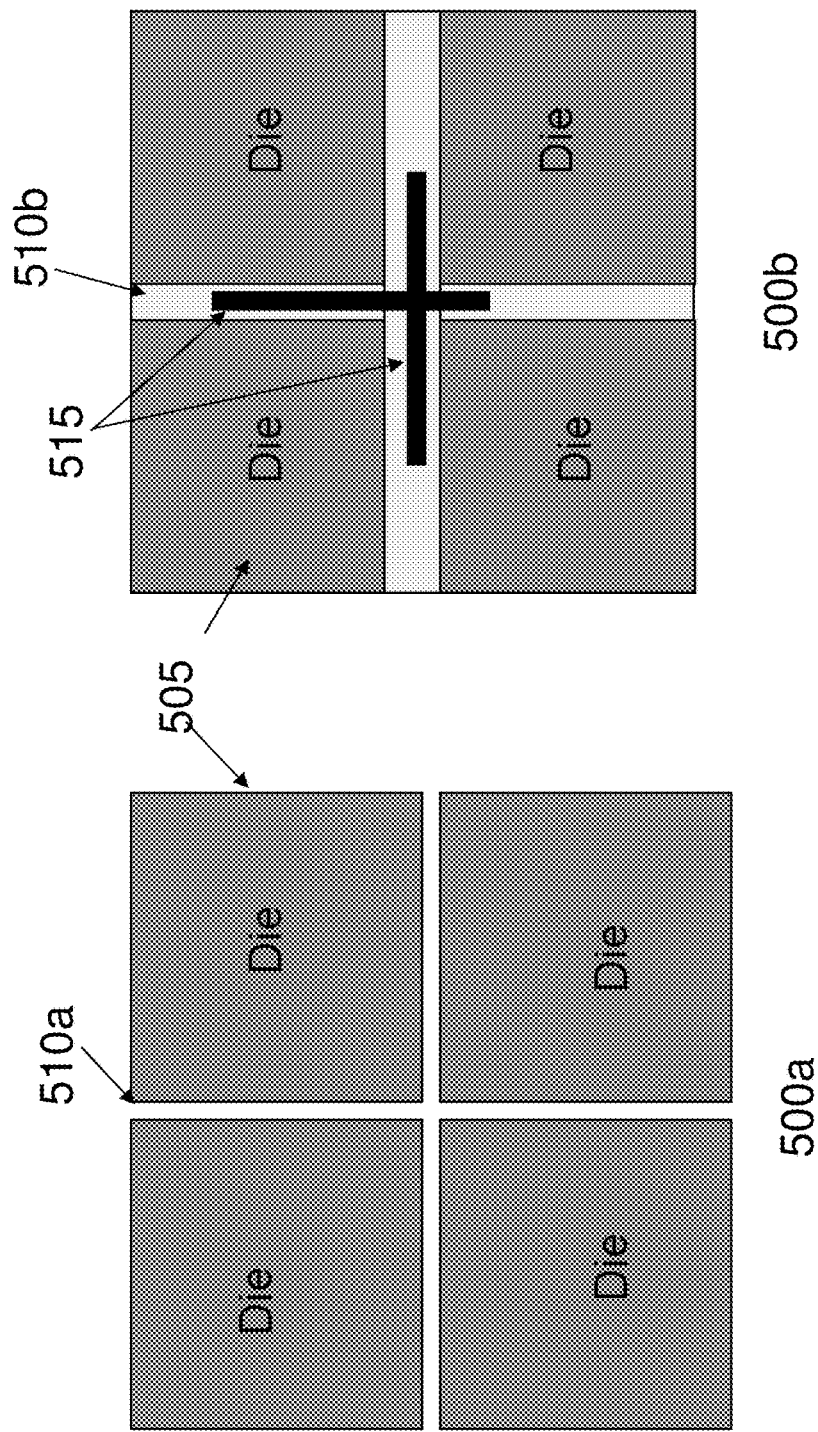
FIG. 5 shows a representative adjustment of the scribe line and density of dummy fill shapes in accordance with aspects of the invention.

FIG. 5 shows a representative adjustment of die to die area and pattern density in accordance with aspects of the invention. In this representation, a beginning structure 500a is compared to an optimized structure 500b. Both structures include product chips (dies) 505 with die to die area (scribe line area or kerf). In the beginning structure 500a, the scribe line 510a is represented as a first dimension; whereas, the optimized structure 500b has a scribe line 510b of a second dimension (different from the first dimension). Depending on the ground rules, the second dimension can be larger or smaller than the first dimension. The scribe line 510b may be adjusted by the optimizer to add or delete dummy fill shapes 515 to adjust the long range pattern density. The dummy fill shapes 515 do not have meet ground rules (i.e., can violate the ground rules) nor do they have to be reliable since they are removed during dicing and make no part of the final integrated circuit. Also, as efficiencies of the fabrication processes advance, the dummy fill shapes 515 and/or scribe line 510b can be adjusted to meet the required ground rules (e.g., adjust pattern densities, to meet ground rule requirements).

Figure 6:
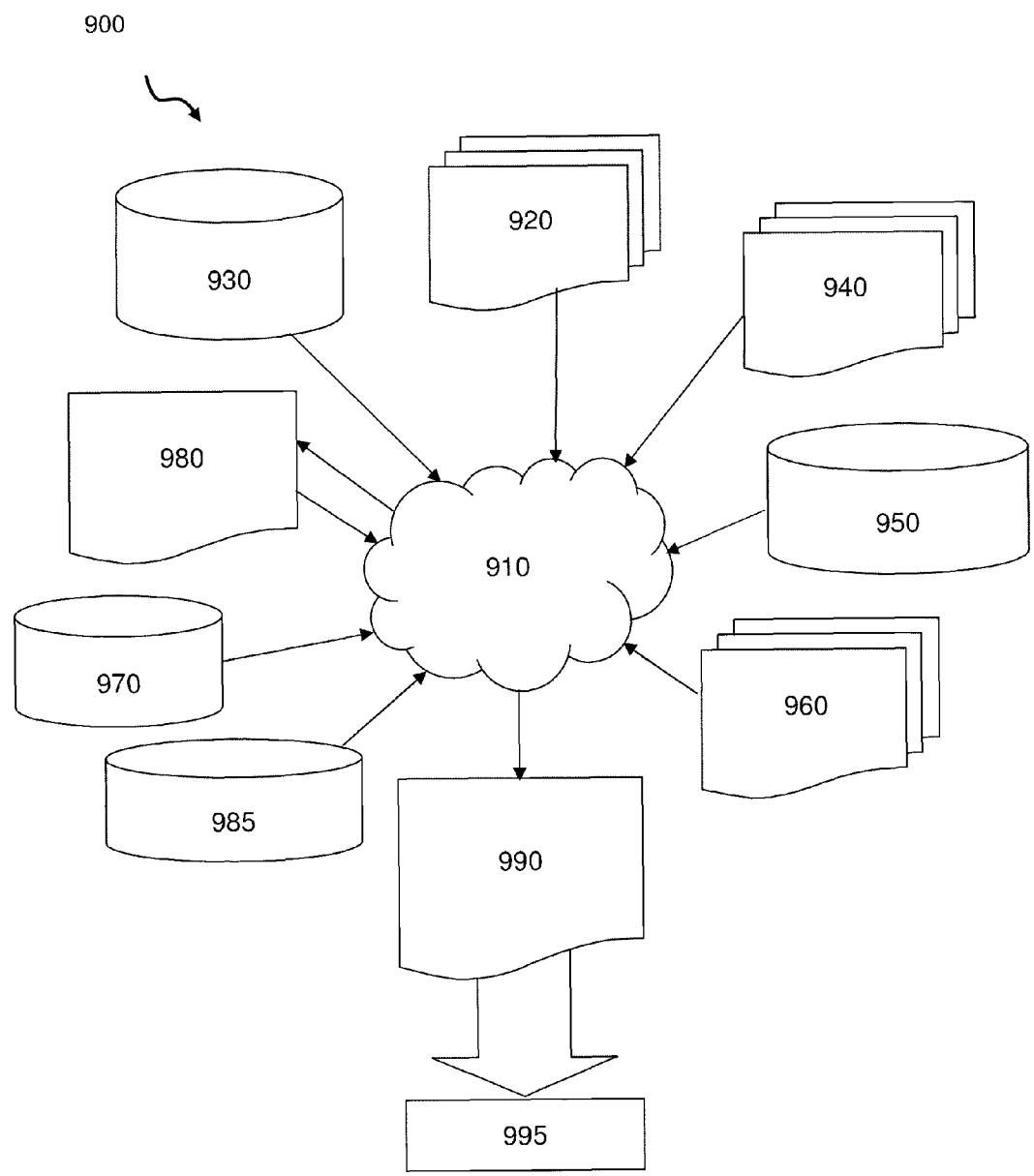
FIG. 6 is a flow diagram of a design process used in semiconductor design, manufacture, and/or test.

FIG. 6 is a flow diagram of a design process used in semiconductor design, manufacture, and/or test. FIG. 6 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 3 and 5. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 6 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 3 and 5. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 3 and 5 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 3 and 5. In one embodiment, design structure 990 may comprise a compiled, executable HDL simulation model that functionally simulates the devices shown in FIGS. 3 and 5.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 3 and 5. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method of adjusting a pattern density of a die, comprising:
    obtaining an area of a scribe line, a pattern area of the scribe line, a product area, and a pattern area for the product area, wherein:
        the pattern area of the scribe line includes shapes within the scribe line for structures that monitor processing of the die and dummy fill shapes, and
        the pattern area for the product area includes shapes used in a design of the die and dummy fill shapes;
    adjusting the area of the scribe line and a density of the dummy fill shapes included in the adjusted scribe line, while maintaining an area of the die, to achieve a pattern density required by technology ground rules for a particular design of the die,
    wherein:
        the obtaining and the adjusting are performed by a processor; and
        data describing the area of the scribe line, the pattern area of the scribe line, the product area, the pattern area of the product area, and the technology ground rules is stored in a memory device.

2. The method of claim 1, wherein a total scribe line area for special fill is equal to Exposed Reticle Area multiplied by ground rule density minus chip pattern area minus scribe line structure area, and added scribe line area is equal to the total scribe line area for special fill minus open scribe line area.

3. The method of claim 2, further comprising creating a dummy shape to increase or decrease the area of the scribe line.

4. The method of claim 2, wherein the layout of the dummy fill shapes within the adjusted scribe line area are used to match pattern density objectives.

5. The method of claim 2, wherein the layout of the dummy fill shapes in the adjusted scribe line violate the technology ground rules.

6. An optimizer implemented in hardware operable to:
    calculate scribe line area needed to adjust a density of the dummy fill shapes, at each level of processing, to meet ground rules of a particular design; and
    calculate how much space is required between dies by use of the following equations:

Total Scribe Line Area for special fill=[(Exposed Reticle Area)(Ground rule Density)−Chip pattern Area−Scribe Line Structure Area]/(density of dummy fill shapes in special fill region)

Added scribe line area=total scribe line area for special fill−open scribe line area.

7. The optimizer of claim 6, further operable to create a step array to add additional area to the scribe line.

8. The optimizer of claim 6, further operable to create a step array to decrease area of the scribe line.

9. A method comprising:
    adjusting dummy fill shapes within a scribe line to achieve a pattern density associated with technology ground rules for a particular design of an integrated circuit at a particular level of manufacture;
    obtaining an area of the scribe line, a pattern area of the scribe line, a product area, and a pattern area for the product area;
    merging product and scribe line structures to obtain a total density at each level of manufacture; and
    increasing the area of the scribe line,
    wherein:
        the adjusting includes increasing the amount of the dummy fill shapes within the increased area of the scribe line to increase pattern density;
        the adjusting includes matching pattern density objectives by using the merged product and scribe line structures with the dummy fill shapes within the scribe line;
        the pattern area of the scribe line includes shapes within the scribe line for structures that monitor processing of the die and dummy fill shapes;
        the pattern area for the product area includes shapes used in a design of the die and dummy fill shapes;
        the dummy fill shapes violate the technology ground rules;
        the obtaining, the adjusting, and the merging are performed by a processor; and
        data describing the area of the scribe line, the pattern area of the scribe line, the product area, the pattern area of the product area, and the technology ground rules is stored in a memory device.

* * * * *